United States Patent [19] [11] 3,716,240

Freeman [45] Feb. 13, 1973

[54] RECORD PLAYER HAVING A CHILD-PROOF DEVICE

[76] Inventor: Edward G. Freeman, 163 Yamate-cho, Nak-ku, Yokohama, Japan

[22] Filed: Sept. 8, 1970

[21] Appl. No.: 70,312

[52] U.S. Cl. ....................................................274/2
[51] Int. Cl. ..............................................G11b 1/00
[58] Field of Search................274/1 R, 1 G, 2, 9 R, 7

[56] References Cited

UNITED STATES PATENTS

| | | | |
|---|---|---|---|
| 1,455,209 | 5/1923 | Karish et al. | 274/1 R |
| 2,441,893 | 5/1948 | McKee | 274/2 |
| 2,866,646 | 12/1958 | Kindred | 274/1 R |

*Primary Examiner*—Leonard Forman
*Assistant Examiner*—Charles E. Phillips
*Attorney*—Wood, Herron & Evans

[57] ABSTRACT

A "child-proof" device incorporated in a record player is comprised of a vertically displaceable arm carrier having a self-positioning means for a pickup arm and to be depressed upon closure of a cabinet lid so that the stylus of a pickup head automatically engages with a starting point of the recorded groove of a record mounted on a turntable. A first switch means is provided which becomes operative upon closure of the lid to close a circuit including an electric motor and a power supply therefor. Second and third switch means become operative to close the circuit only when the pickup arm is positioned correctly by the self-positioning means. Upon termination of the sound reproduction of the entire recorded groove of the record, the pickup head is automatically lifted above and away from the record surface as then the pickup arm slides upwardly on a tapered face means.

3 Claims, 11 Drawing Figures

INVENTOR.
Edward G. Freeman
BY
Wood, Herron & Evans
ATTORNEYS

INVENTOR.
Edward G. Freeman
BY
Wood, Herron & Evans
ATTORNEYS

INVENTOR.
Edward L. Freeman
BY
Wood, Herron & Evans
ATTORNEYS

RECORD PLAYER HAVING A CHILD-PROOF DEVICE

This invention relates generally to record players for use in reproduction of the signals impressed onto a disk record, and in particular to a novel record player equipped with a "child-proof" device thereby to enable children to operate it without any possibility of damaging the surface of a record, a pickup head or other parts of the record player.

Record players (including the so-called "phonographs") as means of sound reproduction have a long history; yet, in recent years, they have been superseded by magnetic recorders in a great many applications. This is mostly because the latter is easier to operate, can be supplied in miniaturized form, and permits the nonspecialist to make both recording and reproducing operations with comparative ease. Nevertheless, the former proves to unquestionable advantage when used for the purpose of quickly selecting a desired one from among a number of short (usually from a few to 10 minutes or so) recorded objects (e.g., commentaries, lectures, stories and tunes) and reproducing it from its exact starting point.

There has been an intrinsic drawback to the prior art record players, however, in that they are not fit for use of children unassisted by adults. A child single-handedly operating such a record player may give a jerk to the pickup head with its stylus on the surface of a record, or let drop the head on or outside of the record surface, thus damaging the surface or the head itself. Nor is it easy for children to place the stylus of the head at the exact starting point of the recorded groove of the record in rotation, and to remove it therefrom without damaging the record surface. They may also carelessly touch and move the pickup arm in the process of sound reproduction, thus leaving scratches in the record surface.

It is accordingly a primary object of the present invention to provide a novel record player equipped with a child-proof device designed to eliminate the above described disadvantages and inconveniences of its predecessors that may be caused especially when they are operated by unaided children.

Another object of the invention is to provide a novel record player equipped with a child-proof device so made that only after a pickup head is set easily at a correct position above a starting point of the recorded groove of a record mounted on a turntable and, thereafter, a cabinet lid of the player is closed, the aforesaid pickup head engages with the starting point and the record is set in rotation.

Still another object of the invention is to provide a novel record player equipped with a child-proof device capable of preventing a pickup head from contacting the surface of a record or the top surface of a player cabinet while a cabinet lid of the player is open.

Yet another object of the invention is to provide a novel record player equipped with a child-proof device so made that a pickup head is repositioned right above the starting point of the recorded groove of a record when placed at a position above the starting point or in the neighboring area thereof while a cabinet lid of the player is open. When placed outside of the neighboring area, on the other hand, the pickup head is automatically horizontally moved to and retained at a limit position on each side.

Yet a further object of the invention is to provide a novel record player equipped with a child-proof device so made that insofar as a pickup head is retained at either of the aforesaid limit positions, a turntable is not set in rotation even when a cabinet lid is closed.

A further yet object of the invention is to provide a novel record player equipped with a child-proof device so made that while a pickup head moves between an end point of the recorded groove of a record and the innermost idling groove thereof upon termination of the sound reproduction of the record, the mentioned pickup head is lifted for disengagement from the record surface and is moved to one of the aforesaid limit positions, thus stopping the rotation of the turntable and therefore the record.

In order to accomplish all these and the various ancillary objects hereinafter set forth, the novel record player of the present invention is comprised of a player cabinet and a cabinet lid, a turntable rotatably mounted on the top surface of the cabinet, means for driving the turntable by means of an electric motor, and a pickup arm supporting a pickup head at one end thereof and mounted on the top surface of the cabinet pivotably in the vertical direction. The mentioned pickup arm is also pivotable in a horizontal plane from a first position where the pickup head comes outside of a record on the turntable, through a second position where the pickup head engages with a starting point of the recorded groove of the record and a third position where the pickup head engages with an end point of the recorded groove of the record, up to a fourth position where the pickup head engages with the innermost idling groove of the record.

More characteristically, the above outlined novel record player of the invention is equipped with a child-proof device comprising (not necessarily in combination):

1. an arm carrier mounted on the top surface of the cabinet displaceably in the vertical direction between a first level where the arm carrier supports the pickup arm so as to keep the pickup head above and away from the surface of the record and a second level where the arm carrier is disengaged from the pickup arm so as to make the pickup head engage with the surface of the record and swing freely, and having on its upper surface a self-positioning means for stably positioning the pickup arm at the second position when the arm carrier is disposed at the first level;
2. a resilient means for normally maintaining the arm carrier at the first level;
3. a first switch means actuated upon vertical displacement of the arm carrier to operate to open a circuit when the arm carrier is disposed at the first level and to close the circuit when the arm carrier is disposed at the second level;
4. an actuator projection means mounted downwardly on the inner surface of the cabinet lid, and adapted to engage its tip portion with the arm carrier upon closure of the cabinet lid to depress the arm carrier from the first level to the second level against the force exerted by the resilient means;
5. a magnetic element forming at least part of the pickup arm near its base portion;

6. a first magnetic attracting means adapted to engage with the magnetic element of the pickup arm when the arm is disposed substantially at the first position;
7. a second magnetic attracting means adapted to engage with the magnetic element of the pickup arm when the arm is disposed substantially at the fourth position;
8. a tapered face means for engaging with the lower edge of the pickup arm during the period when the pickup arm swings from the third position to the fourth position to raise the pickup arm from a level where the pickup head engages with the surface of the record to another level where the pickup head is kept above and away from the surface of the record;
9. a second switch means actuated upon horizontal swing of the pickup arm to operate for opening a circuit when the pickup arm is disposed substantially at the first position and for closing the circuit when the pickup arm is disposed at other positions;
10. a third switch means actuated upon horizontal swing of the pickup arm to operate for opening a circuit when the pickup arm is disposed substantially at the fourth position and for closing the circuit when the pickup arm is disposed at other positions; and
11. an electric circuit means for connecting the contact pairs of the first, second and third switch means, respectively, and said electric motor in series with an electric power supply.

The child-proof device incorporated in the record player of the invention being constructed as in the foregoing, the pickup head is easily set at a position right above the starting point of the recorded groove of a record mounted on the turntable by means of the self-positioning means on the upper surface of the arm carrier. Thereafter, upon closure of the cabinet lid of the record player, the actuator projection means mounted on the inner surface of the cabinet lid engages with the arm carrier and depresses the same to the second level, thus closing the contact pair of the first switch means. As a result, the record is set in rotation as the circuit is closed which connects the contact pairs of the first, second and third switch means and the electric motor in series with a power supply. Simultaneously, the pickup head engages with the starting point of the recorded groove of the record to commence a sound reproducing operation of the record player.

While the cabinet lid of the record player is open, the arm carrier is retained at its first level due to the force exerted by the resilient means, so that the pickup arm is incapable of moving downwardly from its position on the arm carrier. Hence, the pickup head is prevented from contact with the record surface or with the top surface of the player cabinet.

Further, when the pickup head is placed at a position above the starting point of the recorded groove or in a definite area in the neighborhood thereof while the cabinet lid of the record player is open, the pickup head is automatically brought to a correct position right above the starting point due to the action of the self-positioning means on the upper surface of the arm carrier which in that instance is disposed at the first level where it engages with the pickup arm. In event the pickup head is placed outside of the aforesaid definite area, on the other hand, the pickup arm is, due to the magnetic attraction between the magnetic element of the pickup arm and the closer one of the first and second magnetic attracting means, swung to the mentioned first or fourth position where it engages with either of the two magnetic attracting means. The pickup head itself is thus attracted to and retained at a corresponding limit position.

In the above described record player of the invention, the contact pair of the second or third switch means is opened when the pickup head is at its limit position and when, accordingly, the pickup arm is at the first or fourth position. In such a condition, the circuit is not completed between the motor and the power supply even when the contact pair of the first switch means is closed while the cabinet lid is also closed, so that the record is not set in rotation.

As the pickup head reaches the end point of the recorded groove of a record at the end of sound reproduction therefrom and, subsequently, moves on to the innermost idling groove of the record through a guide groove, the lower end of the pickup arm engages with the aforesaid tapered face means to be lifted by the same. After the stylus of the pickup head comes off the guide groove of the record, it is pulled inwardly in the upper direction due to the cooperation of the tapered face means and the magnetic attraction between the magnetic element of the pickup arm and the second magnetic attracting means until, at the mentioned fourth position, the magnetic element engages with the second magnetic attracting means. With the pickup arm at that position, the contact pair of the third switch means is opened, thus breaking the circuit between the electric motor and the power supply and stopping the rotation of the record.

It will now be apparent that the record player of the present invention, constructed as described already, accomplishes the above enumerated objects of the invention, securing a remarkable advantage in that the record player can be easily operated by children without any possibility of damaging the record surface, the pickup head and other parts of the record player.

All the above and the other objects of the invention, as well as the characteristic features and advantages thereof, will become more apparent and understandable from the following detailed description of a preferred form of the invention, when read in connection with the accompanying drawings wherein like reference characters indicate like parts throughout the several Figures, and in which.

Figure 4:
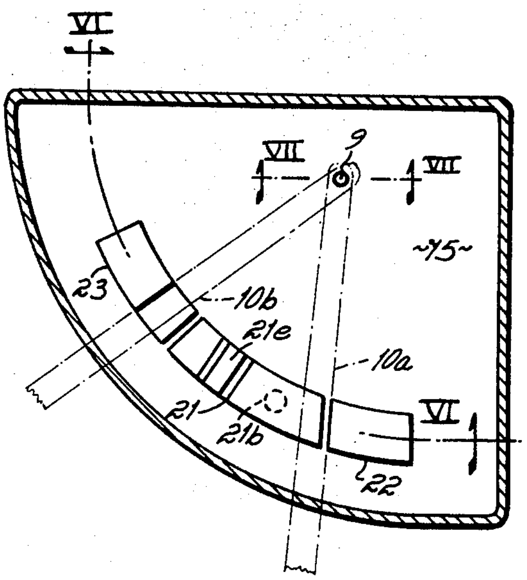
FIG. 4 is a partial top view of a child-proof device portion in the record player of FIGS. 1 through 3, with its cover and pickup arm cut away.
Figure 4A:
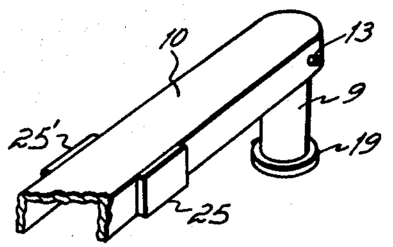
Figure 5:
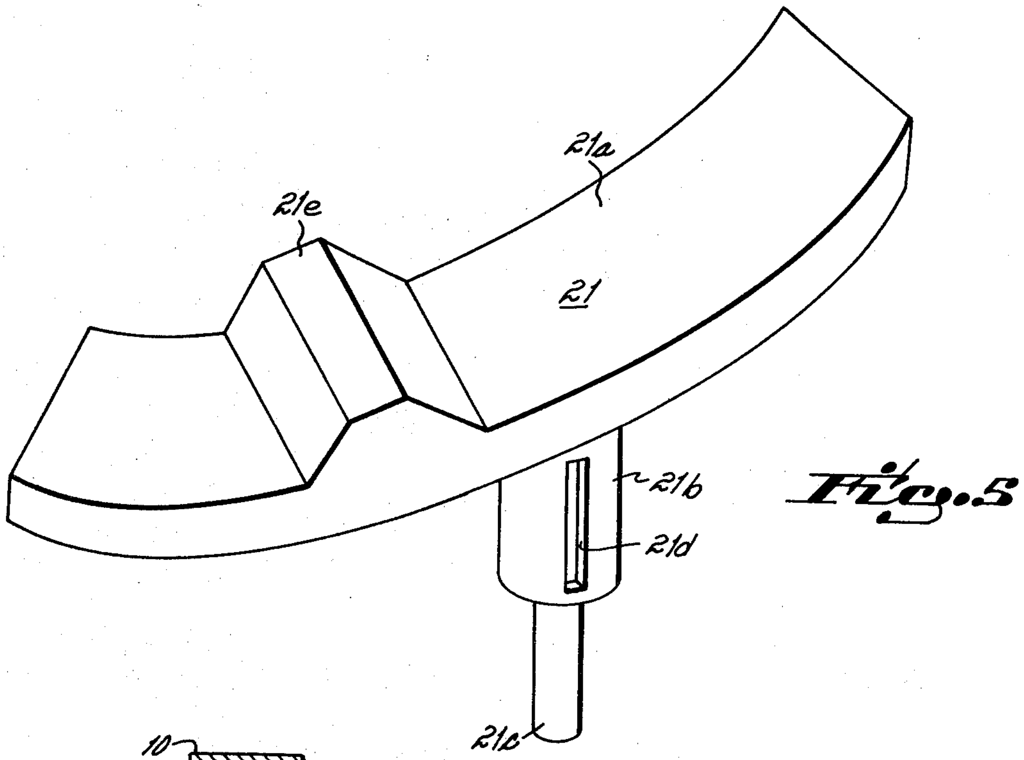
Figure 7:
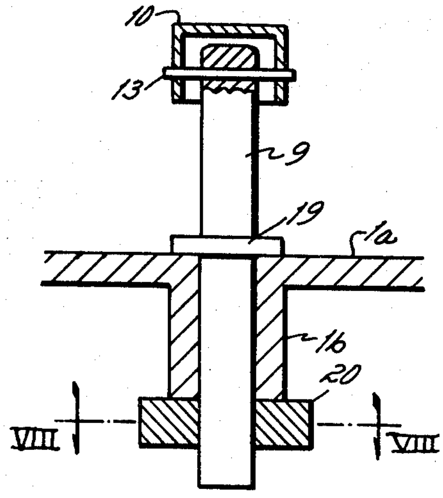
Figure 8:
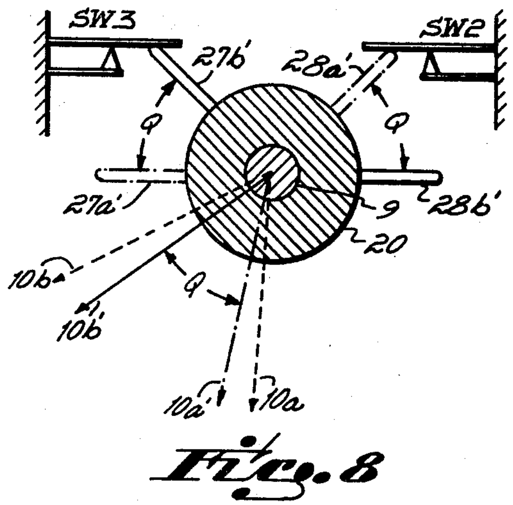
Figure 9:
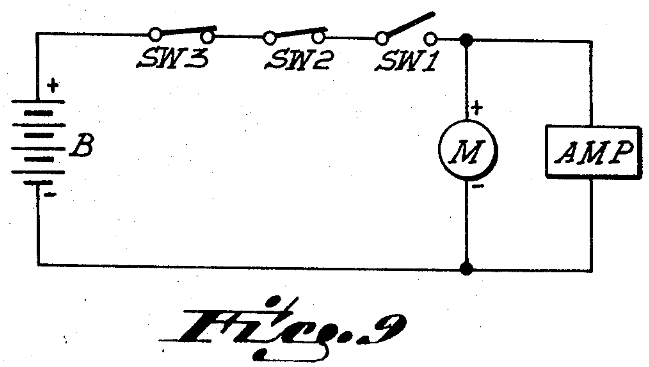
Figure 6A:
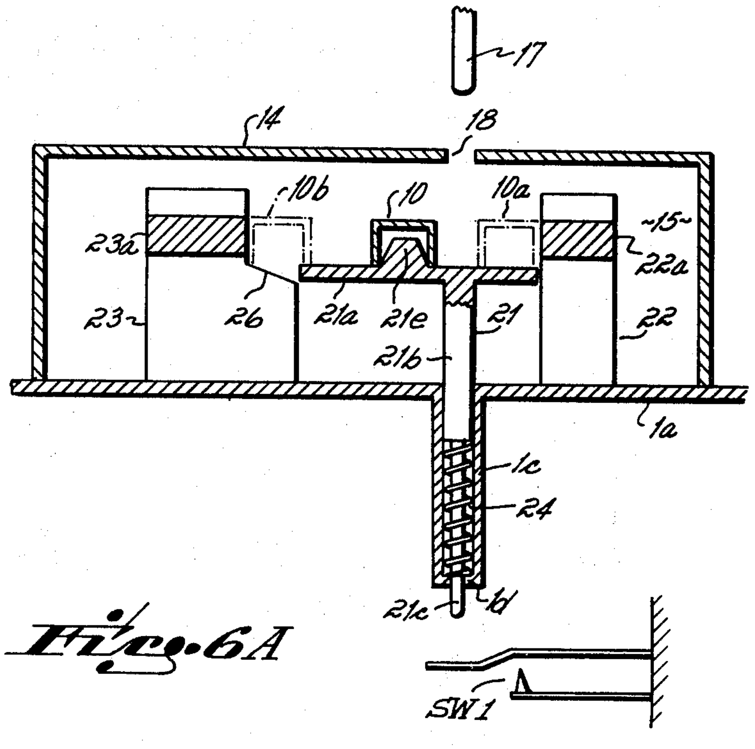
Figure 6B:
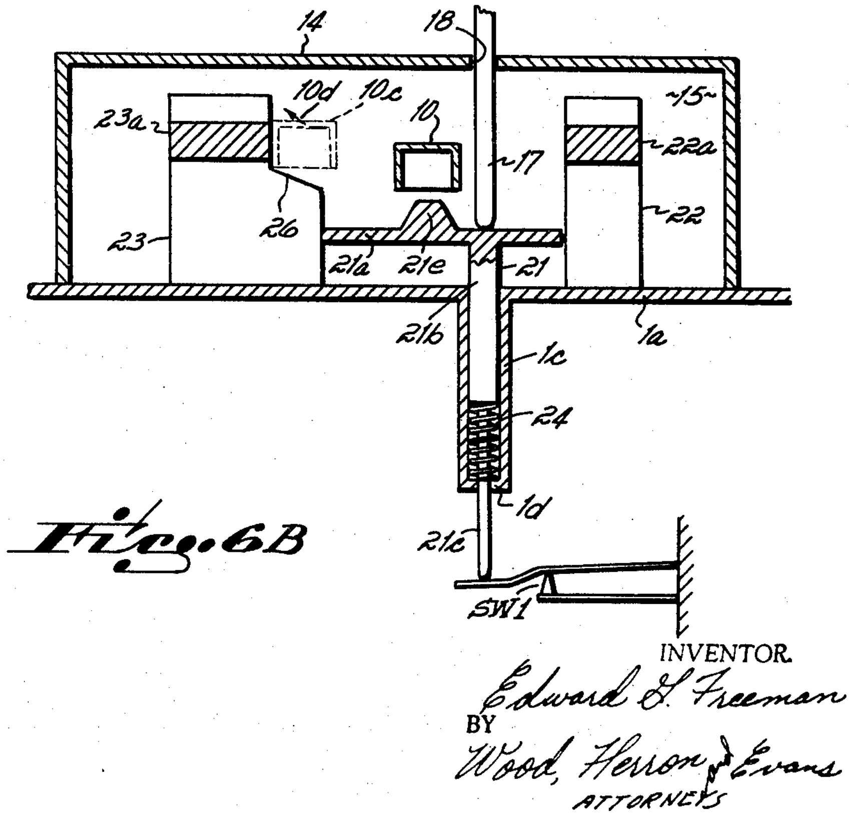

FIG. 4*a* is a fragmentary perspective view of a modification of a base portion of a pickup arm;

FIG. 5 is a perspective view of an arm carrier in the child-proof device of the invention;

FIG. 6A is a vertical sectional view of the child-proof device portion taken along line VI—VI in FIG. 4, with the transparent lid of the record player opened;

FIG. 6B is a vertical sectional view similar to FIG. 6A, only with the transparent lid of the record player closed;

FIG. 7 is a vertical sectional view taken along the plane of line VII—VII in FIG. 4;

FIG. 8 is a horizontal sectional view taken along the plane of line VIII—VIII in FIG. 7; and FIG. 9 diagrammatically illustrates an electric circuit for use in the embodiments of the invention illustrated by way of example in FIGS. 1 through 8.

Figure 1:
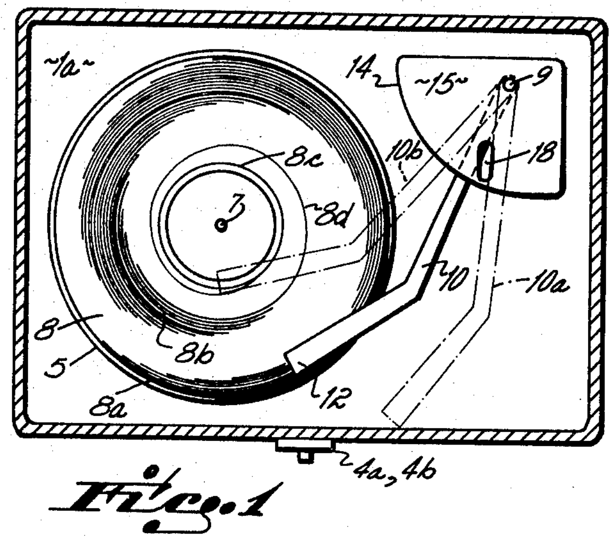
FIG. 1 is a top view of a record player constructed in accordance with the present invention, shown here with its transparent lid closed.
Figure 2:
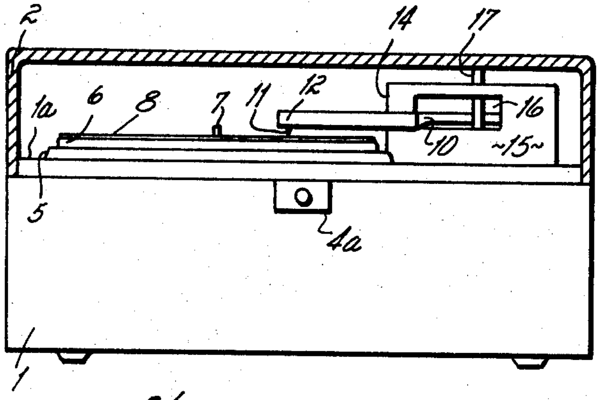
FIG. 2 is a front elevational view of the record player of FIG. 1.
Figure 3:
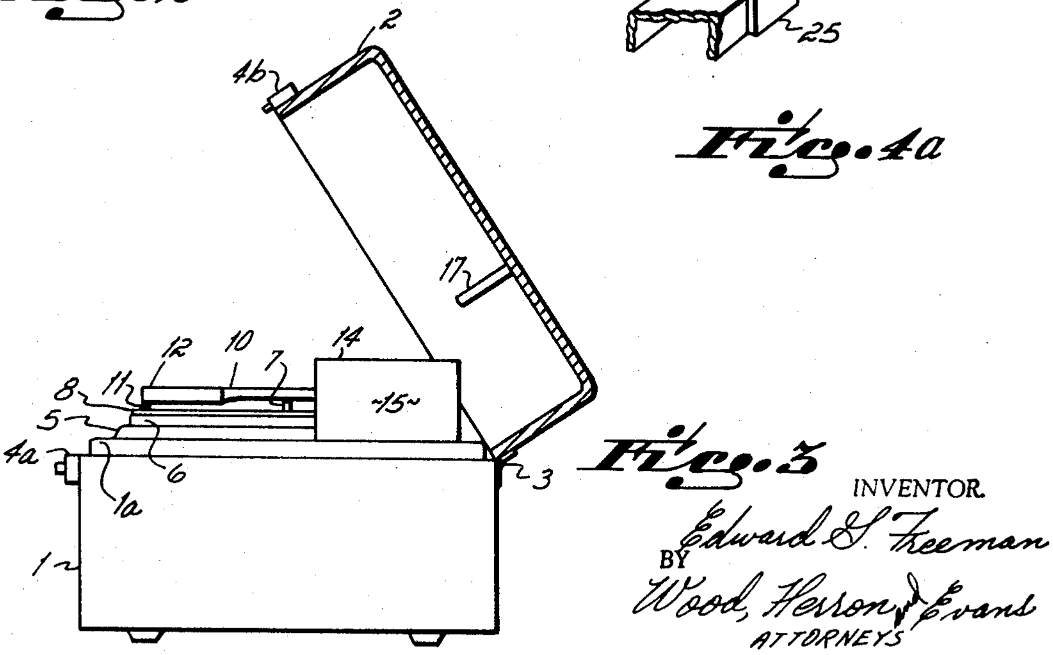
FIG. 3 is a side elevational view of the record player of FIG. 1, shown here with its transparent lid opened.

Referring now to the drawings, FIGS. 1 through 3 illustrate the top, front and side views, respectively, of an entire record player equipped with a child-proof device in accordance with the invention. The record player has a plastic-made cabinet 1 and a cabinet lid 2 shown in the drawings as being transparent. The cabinet lid 2 is openably attached to the cabinet 1 by means of hinges 3 at the back. Mutually engageable members 4*a* and 4*b* are attached to the center portions of the front edges of the cabinet 1 and the cabinet lid 2, so that the cabinet lid 2 can be fixed to the cabinet 1 when closed.

On a top surface 1*a* of the cabinet 1, a turntable 6 is mounted on a circularly elevated portion 5 so as to be rotatable around a shaft 7. A disk record 8 is placed on the turntable 6. As is known, the surface of the record 8 includes a recorded groove portion extending between its starting point 8*a* and its end point 8*b*, an idling groove 8*c* at the innermost position of the record 8, and a comparatively long-pitched helical guide groove 8*d* for leading the stylus of a pickup head from the end point 8*b* to the idling groove 8*c*. On the top surface 1*a* of the cabinet 1 there is also installed a pickup arm 10 so as to be rotatable around a vertical shaft 9. A pickup head 12 including a stylus 11 is supported at the opposite end of the pickup arm 10 to that connected to that shaft 9. The pickup arm 10 is not only rotatable in a horizontal plane between an outermost position 10*a* and an innermost position 10*b*, both indicated by dot-and-dash lines, but is also swingable vertically on a pivot served by a pin 13 illustrated in FIG. 7.

A substantially quadrantal child-proof device unit 15, complete with a cover 14, is provided in an area including the base portion of the pickup arm 10 and the shaft 9. The arcuate wall of the cover 14 is provided with a substantially rectangular opening 16, through which the pickup arm extends outwardly from the unit 15 so as to be swingable in both horizontal and vertical directions within the limits defined by the opening 16.

On the inner surface of the cabinet lid 2, there is formed a vertically extending actuator projection 17 at a position corresponding to one point in the child-proof device unit 15. An elongated hole 18 is cut open in the upper surface of the cover 14 of the unit 15, thereby to introduce the tip portion of the actuator projection 17 into the unit 15 upon closure of the cabinet lid 2.

FIG. 4 shows a partial top view of the child-proof device illustrated in FIGS. 1 through 3, with its cover 14 removed and the pickup arm 10 cut away (only the two limit positions 10*a* and 10*b* of the arm are indicated by dot-and-dash lines). Vertical sectional views taken along the line VI—VI in this drawing are given in FIG. 6, and another vertical sectional view taken along the line VII—VII in FIG. 7.

As is seen from FIG. 7, the shaft 9 extends through the top surface 1*a* of the cabinet 1 and is vertically supported so as to be freely rotatable within a cylindrical hub 1*b*. The vertical movements of the shaft 9 are prevented by means of a flange 19 in one piece therewith and an annular insulator member 20 fixed to the shaft 9 and contacting the lower end of the hub 1*b*. Near the upper end of the shaft 9, there is secured a pin 13 extending horizontally therethrough. The pickup arm 10, shown in the drawings substantially in the shape of an upside-down "U," has one of its ends secured to the pin 13 so as to be swingable in the vertical direction.

Near the arcuate wall of the unit 15, an arm carrier 21, arched almost concentrically therewith, is disposed substantially in parallel with the arcuate wall of the unit 15. Magnet supporting members 22 and 23 are disposed at both ends of the arm carrier 21, as illustrated in FIGS. 4, 6A and 6B. The arm carrier 21 is comprised of a horizontal bed portion 21*a*, a leg portion 21*b* extending vertically from one point thereof, and a projection portion 21*c* extending further downwardly therefrom and having a smaller diameter. The arm carrier 21 is capable of vertical movement as its leg portion 21*b* is loosely fitted in a cylindrical hub 1*c* extending inwardly of the cabinet 1 and formed in one piece with its top surface 1*a*, and the projection portion 21*c* protrudes downwardly out of the hub 1*c* through a hole 1*d* formed at its bottom. In order to make the arm carrier 21 movable in the vertical direction but to prevent it from rotating around the leg portion 21*b*, the leg portion 21*b* is provided with a longitudinally extending slot 21*d* which is to engage with a projection (not shown) on the inside surface of the hub 1*c*. Alternatively, the leg portion 21*b* may be equipped with a rectangular, triangular or other noncircular cross section (including a circular section with a projection on its periphery), and the section of the hub 1*c* may be shaped correspondingly.

A helical compression spring 24 is installed in the annular space formed between the projection portion 21*c* of the arm carrier 21 and the inside surface of the hub 1*c*, exerting its force between the bottom of the hub 1*c* and the shoulder formed between the leg portion 21*b* and projection portion 21*c* of the arm carrier 21 and thus ordinarily pushing the arm carrier 21 upwardly and retaining it at a position illustrated in FIG. 6A. Such a position can be secured by means of an adequate stopper member. In case the slot 21*d* is provided to the leg portion 21*b*, for instance, the upper position given in FIG. 6A can be set as the projection on the inside surface of the hub 1*c* to be engaged with the slot 21*d* engages with the lower end of the slot. An on-off switch SW1 is provided beneath the arm carrier projection portion 21*c*. The switch contacts are kept open as far as the arm carrier 21 is retained at its upper position by means of the helical spring 24 as illustrated in FIG. 6A, since then the lower end of the projection portion 21*c* does not operate the switch SW1. As is still to be described, however, when the cabinet lid 2 is closed so that the actuator projection 17 on the inner surface thereof is inserted into the unit 15 through the hole 18 on the upper surface of the cover 14 of the unit 15, with its lower end thus coming in contact with the horizontal bed portion 21*a* of the arm carrier 21 to depress the arm carrier 21 in spite of the force of the spring 24, as illustrated in FIG. 6B, the lower end of the projection portion 21 contacts the switch SW1 to become operative for closing the switch contacts. When the cabinet lid 2 is opened, the arm carrier 21 is lifted to its upper position by means of the spring 24 as illustrated in FIG. 6A, so that the contact pair of the switch SW1 is opened.

A protuberance 21*e* having a trapezoidal cross section and directed radially with respect to the shaft 9 is formed on the upper surface of the horizontal bed portion 21*a* of the arm carrier 21. The length of the base of that trapezoid approximates to the interior width of the U-shaped section of the pickup arm 10, and the height of the trapezoid is less than the interior height thereof. This protuberance 21*e* forms a self-positioning means for positioning the pickup arm 10 at its starting position, and its functioning will be detailed later.

As may be seen from FIGS. 6A and 6B, the magnet supporting members 22 and 23, also made of plastics, are either formed vertically on the top surface 1*a* of the cabinet 1 or formed in one piece therewith. Ferritic permanent magnets 22*a* and 23*a* forming the magnetic attracting means of the invention are respectively horizontally buried in the holes running through the magnet supporting members 22 and 23 near their upper ends. As is illustrated in FIG. 6A, these permanent magnets are disposed at such a height that when the arm carrier 21 is at its upper position, the side surfaces of the pickup arm 10 resting thereupon are opposed to the pole faces of the magnets. If, therefore, the pickup arm 10 is made of magnetic material, the arm itself becomes a magnetic element, so that the pickup arm 10 is magnetically attracted to these pole faces. In case this pickup arm is made of nonmagnetic material such as plastics, on the other hand, plate members 25 and 25' of magnetic material as the desired magnetic elements are bonded by some adequate method to those portions of the side surfaces of the pickup arm 10 which are opposed to the permanent magnets 22*a* and 23*a*, respectively, as illustrated in FIG. 4*a*. In this manner, the pickup arm made of nonmagnetic material, like that made of magnetic material, is attracted to the pole faces of these permanent magnets 22*a* and 23*a*, thereby to have their side surfaces engaged therewith. While, in the example shown here, the pickup arm 10 or the plate members 25 and 25' bonded thereto are made of magnetic material whereas the elements 22*a* and 23*a* are given as permanent magnets, it will be obvious that the scope of the present invention covers a modification wherein permanent magnets as the desired magnetic elements are attached to the inside surfaces of the pickup arm 10 whereas the elements 22*a* and 23*a* as the magnetic attracting means are provided simply as blocks of magnetic material.

In FIG. 4, the pickup arm is indicated imaginarily at its outermost position 10*a* and innermost position 10*b*. In order for the magnet 22*a* to strongly attract the side surface of the pickup arm 10 and to retain it at this outermost position 10*a*, it is desirable that those surfaces of the magnet 22*a* and its support member 22 which are opposed to the pickup arm 10 conform to the outer side surface of the pickup arm 10 at its outermost position 10*a* as illustrated in FIG. 4. For the same reason, those surfaces of the magnet 23*a* and its support member 23 which are opposed to the pickup arm 10 should desirably conform to the inner side surface of the pickup arm 10 at its innermost position 10*b* as illustrated in FIG. 4.

Referring now to FIGS. 6A and 6B, the magnet supporting member 23 is shaped differently from the magnet supporting member 22 and is formed with a shoulder having a tapered face 26 on its side surface opposed to the arm carrier 21. The upper edge of this tapered face 26, in the same vertical plane as the exposed pole face of the magnet 23*a*, is on a level with the upper surface of the carrier horizontal bed portion 21*a* when the arm carrier 21 is at its upper position (refer to FIG. 6A), whereas the lower edge of the tapered face 26, in the same vertical plane as the lower outside surface of the magnet supporting member 23 facing the end of the horizontal bed portion 21*a*, is on a level with the lower surface of the pickup arm 10 when the pickup head 12 engages with the surface of the record 8 (refer to FIG. 6B). The lower outside surface of the magnet supporting member 23 which faces the end of the horizontal bed portion 21*a* is placed at a position taken by the inner side surface of the pickup arm 10 when the stylus 11 of the pickup head 12 engages with the end point 8*b* of the recorded groove of the record 8. The lower side surface of the supporting member 23 also extends in the same direction as the side surfaces of the pickup arm 10, and the edges at both ends of the horizontal bed portion 21*a* of the arm carrier 21 are respectively disposed in parallel with and at slight intervals from the inner side surface of the magnet supporting member 22 and the lower side surface of the magnet supporting member 23.

As is mentioned already, the pickup arm 10 is vertically swingable on the pin 13; yet, since the arm is integral, as it were, with the shaft 9 through the pin 13 as far as its rotational movements in a horizontal plane are concerned, the shaft 9 and the annular insulator member 20 secured thereto are rotated together with the rotation of the pickup arm between its outermost position 10*a* and its innermost position 10*b*. The annular insulator member 20 is attached with switch means to be operated by the rotational movements of the pickup arm 10 in a horizontal plane, as is illustrated diagrammatically in the cross sectional view of FIG. 8. In the drawing, the outermost position 10*a* and the innermost position 10*b* of the pickup arm 10 are indicated by dotted arrows carrying their corresponding marks, and the angular positions slightly inside of these two limit positions are respectively indicated by a dot-and-dash arrow 10*a'* and a solid-line arrow 10*b'*.

Two switch operating pins extends radially from two points on the periphery of the annular insulator member 20. The positions of these switch operating pins when the pickup arm 10 is in the direction 10*a'* are indicated by dot-and-dash lines 27*a'* and 28*a'*, respectively, whereas the positions of the switch operating pins when the pickup arm 10 is in the direction 10*b'* are indicated by solid lines 27*b'* and 28*b'*. Supposing, therefore, that the angle between the directions 10*a'* and 10*b'* is $\theta$, the angle between 27*a'* and 27*b'* and the angle between 28*a'* and 28*b'* are also equal to $\theta$.

Switches SW2 and SW3 have break contacts disposed as in FIG. 8. Thus, the contact pair of the switch SW2 is closed when the pickup arm 10 is at some angular position between 10*b* and 10*a'*, starts opening when the arm is in the direction 10*a'*, and is opened when the arm is in the narrow range defined by 10*a'* and 10*a*, substantially outside of its outermost limit position. Similarly, the contact pair of the switch SW3 is closed when the pickup arm 10 is at some angular position between 10*a* and 10*b'*, starts opening when the arm is in the direction 10*b'*, and is opened when the arm is in the narrow range defined by 10*b'* and 10*b*, substantially outside of its innermost limit position.

Now, in the interior of the cabinet 1 (shown in FIGS. 1 through 3,) there are contained a battery B as a power supply, a DC constant-speed motor M adapted to drive the turntable 6, schematically shown in FIG. 9, a drive means (not shown) for rotating the turntable at reduced speeds from the output shaft of the electric motor, a transistor amplifier AMP (see FIG. 9) adapted to amplify the signals obtained through the pickup head 12, and a speaker (not shown). The details of their constructions are known already and are no indispensable constituents of the present invention in its narrower aspects, so that descriptions thereon are not given herein. However, it is necessary for the construction of the child-proof device in the record player of the invention that the first switch SW1 shown in FIGS. 6A and 6B, the second switch SW2 and the third switch SW3 shown in FIG. 8, the battery B, the electric motor M and the transistor amplifier AMP be interconnected as illustrated in FIG. 9 by way of example. In the drawing, the contact pairs of the switches SW1, SW2 and SW3 are interconnected in series, and are further connected in series with the terminals of the battery B and the DC motor M, while the power input terminals of the transistor amplifier AMP are parallel connected with the terminals of the DC motor M.

Since, however, the record player of the invention is not to be limited by the battery or the DC constant-speed motor, the battery B can be replaced by AC power supply terminals, and the motor M by an AC synchronous motor. Also, as a modification of the invention, the amplifier and the speaker may not be built in the cabinet of the record player, but the electric signals obtained through the pickup head 12 may be led to an external amplifier to be reproduced as sound thereby. In that instance, the amplifier AMP and the power input wiring therefor are excluded from the circuit diagram of FIG. 9.

The operations and functions of the record player of the invention, equipped with the child-proof device constructed as in the foregoing, are described hereinafter.

Supposing that the record player is in a condition immediately following the termination of the sound reproduction of the entire recorded groove of a record, the cabinet lid 2 is closed upon the cabinet 1 as illustrated in FIG. 2, locked, if necessary, by means of the engaging members 4*a* and 4*b* provided on their front surfaces. Accordingly, the actuator projection 17 formed on the inside surface of the cabinet lid 2 is inserted into the child-proof device unit 15 through the elongated hole 18 cut open through the upper surface of the cover 14 as illustrated in FIG. 6B, and its tip portion, in contact with the horizontal bed portion 21*a*, keeps the arm carrier 21 depressed in spite of the force of the spring 24. Hence, the tip portion of the projection portion 21*c* of the arm carrier 21 also keeps the movable contact of the switch SW1 depressed, thus closing the contact pair.

The pickup head 12 is lifted up off the surface of the record at its innermost limit position, and its pickup arm 10, as illustrated by the dot-and-dash lines 10*c* in FIG. 6B, is retained in such a condition that one of its side surfaces is attracted to the pole face of the permanent magnet 23*a*. The contact pair of the switch SW2 is thus closed, while the contact pair of the switch SW3 is opened, as will be seen from FIG. 8. Accordingly, in spite of the fact that the contact pair of the switch SW1 is closed by the projection portion 21*c* of the arm carrier 21, the circuit of FIG. 9 is broken at the contact pair of the switch SW3, thus preventing the rotation of the motor M. The turntable 6 and therefore the record 8 are stopped, too.

It is impossible to reach the pickup arm 10 as far as the cabinet lid 2 is kept closed. Moreover, the pickup arm 10 is itself attracted to and stably retained by the permanent magnet 23*a*. The arm 10 is thus kept immovable even when the record player is moved, so that there is practically no possibility of the surface of the record being damaged as long as the above described condition is maintained.

Now, let it be assumed that the cabinet lid 2 is opened and kept at a position shown in FIG. 3 by some adequate means not illustrated in the drawing. The actuator projection 17 formed on the inside surface of the cabinet lid 2 disengages from the arm carrier 21, so that the arm carrier 21 is lifted to and retained at its upper limit position illustrated in FIG. 6A by means of the helical compression spring 24. The pickup arm 10 in this instance is attracted to and retained by the pole face of the permanent magnet 23*a* at the position indicated by the dot-and-dash lines 10*b*, as is mentioned already. Also, the contact pair of the switch SW1 is opened.

In order to clarify the relationship between the positions of the pickup arm 20 and the relative arrangement of the pickup head 12 and the record surface, FIGS. 6A and 6B show the sections taken along the line VI—VI (in FIG. 4) of the child-proof device unit.

With the cabinet lid 2 opened, the child-proof device unit 15 is in a condition illustrated in FIG. 6A. While a child operating the record player is capable of freely moving the pickup arm 10 by hand, its transverse movements are limited by the side surfaces of the permanent magnet supporting members 22 and 23, its upward movement by the upper edge of the opening 16 of the cover 14 of the unit 15, and its downward movement by the upper surface of the horizontal bed portion 21*a* of the arm carrier 21. Hence, at any position between its two limit positions 10*a* and 10*b*, the pickup arm 10 cannot be moved lower than the position it occupies when its lower surface comes in contact with the upper surface of the horizontal bed portion 21*a*. This lower limit position of the pickup arm 10, as is seen from the pickup head 12 and the record 8 shown correspondingly by dotted lines on the lefthand side of FIG. 6A, is such that the pickup head 12 is held above the record surface. Hence, no matter how the pickup arm 10 is moved by the child, or even dropped off his hand, the stylus 11 of the pickup head 12 does not reach the record surface, so that there is virtually no possibility of his damaging the record surface or the pickup head.

When, for the replacement of the record mounted on the turntable 6 and other purposes, the pickup head 12 is moved outside of the turntable to such a position that the pickup arm 10 comes to its outermost position (marked 10a in FIG. 6A), the side surface of the arm is attracted to and stably retained by the pole face of the permanent magnet 22a. When, on the other hand, the pickup arm 10 is left at a position on the horizontal bed portion 21a of the arm carrier 21 and intermediate between the trapezoidal protuberance 21e and the outermost position 10a, the arm 10 is attracted rightwardly on the horizontal bed portion 21a by the magnet 23a, until it reaches the position 10a and is retained thereby the pole face of the magnet.

For re-operating the record player following the replacement of the record 8, the pickup head 12 is lifted, moved leftwardly and lowered at an approximate position where the stylus 11 is located above the starting point 8a of the recorded groove of the record. Thereupon, the depressed bottom of the pickup arm 10 engages with the trapezoidal protuberance 21e of the arm carrier 21, so that the arm is automatically brought to the position 10 indicated by the solid lines in FIG. 6A. To explain the above feature of the invention in more detail, the trapezoidal protuberance 21e is located substantially midway between the pole face of the magnet 22a and the pole face of the magnet 23a, so that, in that neighborhood, the forces of these two permanent magnets 22a and 23a exerted in the opposite directions to the arm 20 made of magnetic material, or to the plate members 25 and 25' bonded thereto, are at equilibrium, thus producing no appreciable resultant in the transverse direction. When the pickup arm 10 is mounted exactly upon the trapezoidal protuberance 21e, as illustrated in FIG. 6A or 6B, it is retained in that stable position. In event the arm 10 is lowered slightly off the stable position on either side, one of the legs of the arm slides down the slanted surface of the trapezoid on the same side due to the inclination of that surface and the gravity working on the arm itself, until it reaches the stable position 10 in FIG. 6A. When the pickup arm 10 is lowered off the above stable position over a length greater than the transverse width of one of the slanted surfaces of the trapezoid, the arm is in such a condition that either (1) one of its legs is mounted on the upper horizontal surface of the trapezoid, (2) one of them is mounted on the slanted surface of the trapezoid on the opposite side, or (3) both of them are mounted on the horizontal bed portion 21a outside of the trapezoidal protuberance 21e. In either of the above cases, the forces exerted to the pickup arm 10 by the permanent magnets 22a and 23a are no longer at equilibrium, so that the arm is attracted by the closer one of the magnets and is retained thereby at the position 10a or 10b in FIG. 6A.

Thus, the trapezoidal protuberance 21e on the arm carrier 21 works as the means for self-positioning the pickup arm 10 at its starting position. When the pickup head 12 is brought by the child to an approximate position above the starting point 8a of the recorded groove, the pickup arm 10 is automatically adjusted at its stable position. In event the pickup head is placed considerably off its correct position with the resultant failure in the automatic positioning as above, the pickup arm 10 is always attracted to either one of its limit positions 10a and 10b and is never left at some intermediate position between 10 and 10a or between 10b and 10. Hence, even if the cabinet lid 2 of the record player is subsequently closed by the unknowing child, there is virtually no possibility of the record being reproduced from the middle of its recorded groove, or of the pickup head 12 being lowered outside of the record surface. The former is because the pickup arm 10 not positioned correctly is moved to either of the limit positions 10a and 10b, where either of the switches SW2 and SW3 in FIG. 8 is opened, with the result that the electric motor M does not operate even when the switch SW1 is automatically closed by the closure of the cabinet lid 2. The latter is because the pickup head 12 is kept in a condition as illustrated on the lefthand side of FIG. 6A.

It is to be noted that the position of the trapezoidal protuberance 21e on the upper surface of the arm carrier 21 is so designed that, when the arm carrier 21 is lowered to the pcsition in FIG. 6B with its protuberance 21e correctly engaged with the pickup arm 10, the stylus 11 of the pickup head 12 engages with the starting point 8a of the recorded groove of the record 8. For this purpose, it is desirable that the protuberance 21e adjustably installed on the upper surface of the arm carrier 21, instead of being formed fixedly thereon. For instance, the protuberance 21e may be formed in the shape of a truncated cone and mounted on the upper surface of the arm carrier 21 so as to be rotatable around an axis other than the axis of that truncated cone. The protuberance 21e will then be secured after each desired repositioning.

Let is be assumed that the pickup arm 10 has been positioned correctly by means of the trapezoidal protuberance 21e and that, consequently, the arm 10 is supported on the arm carrier 21 at the position indicated by the solid lines in FIG. 6A. Since, in this instance, the pickup arm 10 lies intermediate between 10a' and 10b' of FIG. 8, both of the switches SW2 and SW3 are closed. Then, upon closure of the cabinet lid 2, the actuator projection 17 on the inside surface of the cabinet lid 2 is inserted into the child-proof device unit 15 through the elongated hole 18 of its cover 14. The tip portion of the actuator projection 17 thus inserted into the unit 15 comes in contact with the upper surface of the horizontal bed portion 21a of the arm carrier 21 and depresses the arm carrier 21 in spite of the force of the helical compression spring 24, with the result that the condition illustrated in FIG. 6B is obtained when the cabinet lid 2 is completely closed.

In the procedure described immediately above, the pickup arm 10 lowers together with the arm carrier 21 at first. Then, as the stylus 11 of the pickup head 12 engages with the starting point 8a of the recorded groove of the record 8, the arm carrier 21 leaves the pickup arm 10 at that position and further goes down until it reaches the position shown in FIG. 6B. In that position, the upper end of the trapezoidal protuberance on the arm carrier 21 is lower than the bottom of the pickup arm 10 left on the record surface, so that the protuberance 21e presents no hindrance to the pickup arm 10 while the stylus 11 of the pickup head 12 moves along the recorded groove to its end point 8b and thence to the innermost idling groove 8c via the guide groove 8d. Following the engagement of the stylus 11 of the pickup head 12 with the starting point 8a of the recorded groove, the contact pair of the switch SW1 is closed by the tip of the projection portion 21c of the arm carrier 21. Since all the contact pairs of the switches SW1, SW2 and SW3 are then closed, the circuit of FIG. 9 is completed. Supplied with power from the battery B, the DC constant-speed motor M sets in rotation in order to rotate the turntable 6 and therefore the record 8 through the drive means not shown in the drawings. Thus, the record 8 is reproduced from the exact starting point of its recorded groove.

Thereafter, the pickup arm 10 cannot be touched as long as the cabinet lid 2 is closed, so that the sound reproduction of the records proceeds safely. As the stylus 11 of the pickup head 12 reaches the end point 8b of the recorded groove after a definite length of time, the stylus 11 is led to the innermost idling groove 8c of the record via the comparatively long-pitched helical guide groove 8d. During this travel of the stylus 11 from 8b to 8c, the inner leg of the pickup arm 10 engages with the tapered face 26 of the permanent magnet supporting member 23, as indicated by the dot-and-dash lines 10c in FIG. 6B. Thereupon, the pickup arm 10 moves upwardly as indicated by the arrow 10d in the same drawing, so that the stylus 11 of the pickup head 12 disengages from the guide groove 8d. Although the inwardly directed force exerted to the pickup head 12 by the guide groove 8d ceases upon disengagement of the stylus 11 from the recorded groove 8d, the magnetic attraction between the pole face of the magnet 23a and the side surface of the pickup arm 10 increases, as is described already. The pickup arm 10 thus keeps on moving upwardly in the lefthand direction (the arrow 10d) along the tapered face 26, until it reaches the position indicated by 10b in FIG. 6A to be retained there in contact with the pole face of the magnet 23a. The contact pair of the switch SW3 is opened when the pickup arm 10 reaches the limit position 10b (refer to FIG. 8), thus breaking the circuit of FIG. 9 to stop the motor M and, therefore, the turntable 6 and the record 8. If the amplifier AMP is built into the record player, its power input is also broken. Thus, the sound reproduction of the entire recorded groove of the record comes to an end, and the record player returns to the condition assumed at the beginning of the present description on its operations and functions.

When the cabinet lid 2 is opened in the process of the above described sound reproduction of the record, i.e., while the stylus 11 of the pickup head 12 is located intermediately between the starting point 8a and the end point 8b of the recorded groove of the record 8, the arm carrier 21 moves upwardly from its position of FIG. 6B to the position of FIG. 6A, thus opening the contact pair of the switch SW1, stopping the motor M and therefore the turntable 6 as well as the record 8, and lifting the pickup arm 10 out of engagement with the record surface. If, in this process of upward movement, the position of the pickup arm 10 with respect to its transverse direction is within the positioning range of the trapezoidal protuberance 21e, the arm is lifted to the position indicated by the solid lines in FIG. 6A. If the position is outside of the range, on the other hand, the arm is attracted by the magnet 22a or 23a to the position indicated by the dot-and-dash lines 10a or 10b in FIG. 6A, as is described previously with connection to the positioning of the pickup arm 10 at its starting position.

It is necessary that the compression spring 24 adapted to retain the arm carrier 21 at its upper position indicated in FIG. 6A have a sufficient force to resist the downward movement of the arm carrier 21 caused by a slight downward pressure applied to the pickup arm 10. Otherwise, the stylus 11 of the pickup head 12 will easily damage the record surface. The increased elastic force of the spring 24, of course, will require a correspondingly greater force to depress the arm carrier 21 by closing the cabinet lid 2. This difficulty can be easily overcome by either (1) providing a sufficiently heavy cabinet lid 2, (2) disposing the actuator projection 17 sufficiently close to the hinge side of the lid 2, or (3) providing an adequate force multiplying means (e.g., a lever means) between the tip portion of the actuator projection 17 and the arm carrier 21. The mutually engageable members 4a and 4b on the front surfaces of the cabinet 1 and the cabinet lid 2 serve the purpose of holding the cabinet lid 2 in a closed state after the lid is pressed down in spite of the force of the spring 24, especially when its weight is not sufficiently heavy.

Although the novel record player of the invention, and especially its child-proof device, has been shown and described in the foregoing in accordance with its specific embodiments, it will be obvious that the invention is not to be limited thereby but is to be interpreted broadly and in a manner consistent with the spirit and scope of the invention as defined in the appended claims.

I claim:

1. A record player comprising a player cabinet and a cabinet lid, a turntable rotatably mounted on the top surface of said cabinet, means for driving said turntable by means of an electric motor, and a pickup arm supporting a pickup head at its one end and mounted on the top surface of said cabinet pivotably in the vertical direction, said pickup arm being also pivotable in a horizontal plane from a first position where said pickup head comes outside of a record on said turntable, through a second position where said pickup head engages with a starting point of the recorded groove of said record and a third position where said pickup head engages with an end point of the recorded groove of said record, up to a fourth position where said pickup head engages with the innermost idling groove of said record; characterized in that said record player is equipped with a child-proof device comprising:

an arm carrier mounted on said top surface of said cabinet displaceably in the vertical direction between a first level where said arm carrier supports said pickup arm so as to keep said pickup head above and away from the surface of said record and a second level where said arm carrier is disengaged from said pickup arm so as to make said pickup head engage with the surface of said record and swing freely, and having on its upper surface a self-positioning means for stably positioning said pickup arm at said second position when said arm carrier is disposed at said first level;

a resilient means for normally maintaining said arm carrier at said first level;

a switch means actuated upon vertical displacement of said arm carrier to operate to open a circuit when said arm carrier is disposed at said first level and to close the circuit when said arm carrier is disposed at said second level;

a magnetic element forming at least part of said pickup arm near its base portion;

a first magnetic attracting means adapted to engage with said magnetic element of said pickup arm when said pickup arm is disposed substantially at said first position;

a second magnetic attracting means adapted to engage with said magnetic element of said pickup arm when said arm is disposed substantially at said fourth position;

a tapered face means for engaging with the lower edge of said pickup arm during the period when said pickup arm swings from said third position to said fourth position to raise said pickup arm from a level where the pickup head engages with the surface of said record to another level where the pickup head is kept above and away from the surface of said record; and an electric circuit means for connecting the contact pair of said switch means and said electric motor with an electric power supply.

2. A record player as claimed in claim 1, in which said child-proof device further comprises a second switch means actuated upon horizontal swing of said pickup arm to operate to open said electric circuit means when said pickup arm is disposed substantially at said first position and to close the same when said pickup arm is disposed at other positions, and a third switch means actuated upon horizontal swing of said pickup arm to operate to open said electric circuit means when said pickup arm is disposed substantially at said fourth position and to close the same when said pickup arm is disposed at other positions, said second switch means and said third switch means being series connected with said first recited switch means in said electric circuit means.

3. A record player as claimed in claim 1, in which said child-proof device further includes an actuator projection means mounted downwardly on the inner surface of said cabinet lid and adapted to engage its tip portion with said arm carrier upon closure of said cabinet lid to depress said arm carrier from said first level to said second level against the force exerted by said resilient means.

* * * * *